(12) United States Patent
Rensinghoff

(10) Patent No.: US 7,108,279 B2
(45) Date of Patent: Sep. 19, 2006

(54) AIRBAG ARRANGEMENT

(75) Inventor: Volker Rensinghoff, Grossostheim (DE)

(73) Assignee: Takata-Petri AG, Aschaffenburg (DE)

( * ) Notice: Subject to any disclaimer, the term of this patent is extended or adjusted under 35 U.S.C. 154(b) by 211 days.

(21) Appl. No.: 10/369,126

(22) Filed: Feb. 20, 2003

(65) Prior Publication Data

US 2004/0026909 A1    Feb. 12, 2004

(30) Foreign Application Priority Data

Feb. 20, 2002    (DE) ................... 102 07 885

(51) Int. Cl.
*B60R 21/205*    (2006.01)
(52) U.S. Cl. .................................... 280/732
(58) Field of Classification Search ............ 280/728.1, 280/730.1, 731, 732, 743.1, 750
See application file for complete search history.

(56) References Cited

U.S. PATENT DOCUMENTS

| | | | |
|---|---|---|---|
| 3,370,886 A | | 2/1968 | Frost ........................... 297/384 |
| 3,618,979 A | | 11/1971 | Gulette |
| 3,664,682 A | * | 5/1972 | Wycech ................... 280/730.1 |
| 3,767,229 A | * | 10/1973 | Cain ........................... 280/732 |
| 3,784,223 A | * | 1/1974 | Hass et al. ............... 280/730.1 |
| 3,801,126 A | | 4/1974 | Knight et al. ............... 280/150 |
| 4,153,273 A | * | 5/1979 | Risko ........................ 280/740 |
| 4,169,613 A | * | 10/1979 | Barnett ........................ 280/732 |
| 5,570,901 A | * | 11/1996 | Fyrainer ................. 280/730.1 |
| 5,609,356 A | * | 3/1997 | Mossi ....................... 280/731 |
| 5,895,069 A | * | 4/1999 | Heilig et al. ............. 280/730.1 |
| 5,997,028 A | * | 12/1999 | Lenz ........................... 280/727 |
| 2002/0149187 A1 | * | 10/2002 | Holtz et al. ................ 280/749 |

FOREIGN PATENT DOCUMENTS

| | | |
|---|---|---|
| DE | 198 60 804 A1 | 7/2000 |
| DE | 199 04 100 A1 | 8/2000 |
| EP | 1 164 061 A1 | 12/2001 |
| GB | 2263671 A * | 8/1993 |
| JP | 1-123756 | 8/1989 |
| JP | 05008737 A * | 1/1993 |
| JP | 9-11837 | 1/1997 |
| JP | 11-278196 | 10/1999 |

* cited by examiner

*Primary Examiner*—Paul N. Dickson
*Assistant Examiner*—Laura B. Rosenberg
(74) *Attorney, Agent, or Firm*—Foley & Lardner LLP

(57) ABSTRACT

An airbag arrangement for a vehicle having a driver's airbag is disclosed. The airbag arrangement has an airbag module having an airbag between the steering wheel and the instrument panel of the vehicle. In the event of a crash, the airbag is deployed between the steering wheel and the instrument panel and, as a result, supports the steering wheel. The effect achieved by this is that the driver's airbag is better positioned with regard to the vehicle occupant, since deformation of the steering wheel by the forces acting on the driver's airbag in the event of a crash is prevented or reduced by means of the airbag. The inflated airbag can extend as far as the windshield of the vehicle. As a result, the forces introduced into the steering wheel in the event of a crash are also conducted away into the windshield. In addition, contact of a vehicle occupant not wearing his/her seatbelt with the can be prevented by suitably defining the size of the inflated airbag.

18 Claims, 4 Drawing Sheets

AIRBAG ARRANGEMENT

BACKGROUND

The invention relates to an airbag module for vehicles and, in particular, to an airbag module for motor vehicles equipped with a conventional driver's airbag.

The decelerations which the driver experiences in frontal collisions are, as a rule, conducted away via the inflated driver's airbag into the steering wheel and into the steering column. The following problems occur. During the dissipation of energy, parts of the steering wheel, the steering column and adjusting and connecting elements of the steering wheel and the steering column are deformed. Particularly in the case of severe forward displacement of the occupant and occupant kinematics, which are difficult to control (for example, if a driver does not have his/her seatbelt on), the "steering wheel and steering column" subsystem is deformed by high forces. As a result, the airbag cannot be optimally positioned with regard to the occupant. The risk of injury increases.

These effects could be reduced by, for example, the steering wheel rim being stiffened, or a predefined position of the steering column being produced or maintained in the event of a crash. However, the styling of the steering wheel means that stiffening is often not possible. A predefined position of the steering column can be produced only with a high outlay; for example, stiffenings in the steering column connection or additional deformation elements in and/or on the steering column may be provided.

In the event of an occupant who is not wearing his/her seatbelt, it can be attempted to optimize the positioning of the airbag with regard to the occupant by means of a relatively large airbag circumference and/or intercepting straps in the airbag. Furthermore, a knee airbag may be provided.

However, these solution attempts are complex and some of them are not optimally effective.

SUMMARY

One object of the present invention is to prevent or reduce "steering wheel and steering column" subsystem deformation caused by forces acting on the driver's airbag in the event of a crash.

In particular, but not exclusively, the present invention relates to an airbag arrangement for a vehicle having a driver's airbag. The airbag arrangement has an airbag module having an airbag between the steering wheel and the instrument panel of the vehicle. In the event of a crash, the airbag is deployed between the steering wheel and the instrument panel and, as a result, supports the steering wheel. The effect achieved by this is that the driver's airbag is better positioned with regard to the vehicle occupant since deformation of the steering wheel by the forces acting on the driver's airbag in the event of a crash is prevented or reduced by means of the airbag. The inflated airbag can extend as far as the windshield of the vehicle. As a result, the forces introduced into the steering wheel in the event of a crash are also conducted away into the windshield. In addition, contact of a vehicle occupant who is not wearing his/her seatbelt with the windshield can be prevented by suitably defining the size of the inflated airbag.

The present invention provides an airbag arrangement for a vehicle, having an airbag module arranged in the region between a steering wheel and an instrument panel of the vehicle, the airbag module having an airbag which, when inflated, extends between the steering wheel and the instrument panel.

An airbag between the steering wheel and the instrument panel of the vehicle in addition to a driver's airbag enables the "steering wheel and steering column" subsystem to be supported. In this case, the effective space of the airbag is situated behind the steering wheel above and/or below the steering wheel connection. In order to prevent or reduce deformations, the airbag conducts the forces introduced into the steering wheel into the instrument panel.

The functioning capacities of the airbag can be adapted to the system requirements. In addition to the support of the steering wheel rim, the driver's airbag can be kept in position above the steering wheel by selection of a suitable airbag size.

The airbag arrangement according to the present invention has overall the advantage that the kinematics of the vehicle occupant in the event of a crash can be better controlled by the fact that deformations of steering wheel and steering column can be prevented irrespective of the steering column angle and steering wheel turning angles.

This enables the construction of the connection of the steering column to the vehicle to be simplified for the vehicle manufacturer.

The inflated airbag preferably extends along the steering column of the vehicle and completely fills the gap between the instrument panel and the steering wheel. This results in a particularly effective support of the steering wheel.

In one embodiment of the present invention, the airbag module is integrated in the instrument panel. The advantage of this embodiment resides, in particular, in the saving on space and in the esthetics.

In another embodiment of the present invention, the inflated airbag extends as far as the windshield of the vehicle. This embodiment has the advantage that the forces introduced into the steering wheel in the event of a crash are not only conducted away into the instrument panel, but also into the windshield. In addition, if an occupant is not wearing his/her seatbelt, the forces are conducted away in a first contact phase into the windshield; subsequently, the airbag configured in such a manner provides an effective protection for the head. A direct contact of the occupant's head with the windshield can therefore be prevented by suitably defining the size of the airbag.

In another embodiment of the present invention, the inflated airbag extends around the steering column into a gap between the instrument panel and the knees of a vehicle occupant below the steering column. As a result, an existing knee airbag can be replaced and/or assisted.

In another embodiment of the present invention, the inflated airbag comes into contact with the top region of the rim of the steering wheel and supports the rim. The airbag in that region, which, when inflated, comes into contact with the steering wheel rim, can have a supporting element. The supporting element serves for reducing the flexibility of the inflated airbag under load with the result that the steering wheel rim is supported even more effectively.

The supporting element is preferably formed by a reinforcement integrated in the airbag. An airbag of this type can be produced simply and cost-effectively.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

Figure 1:
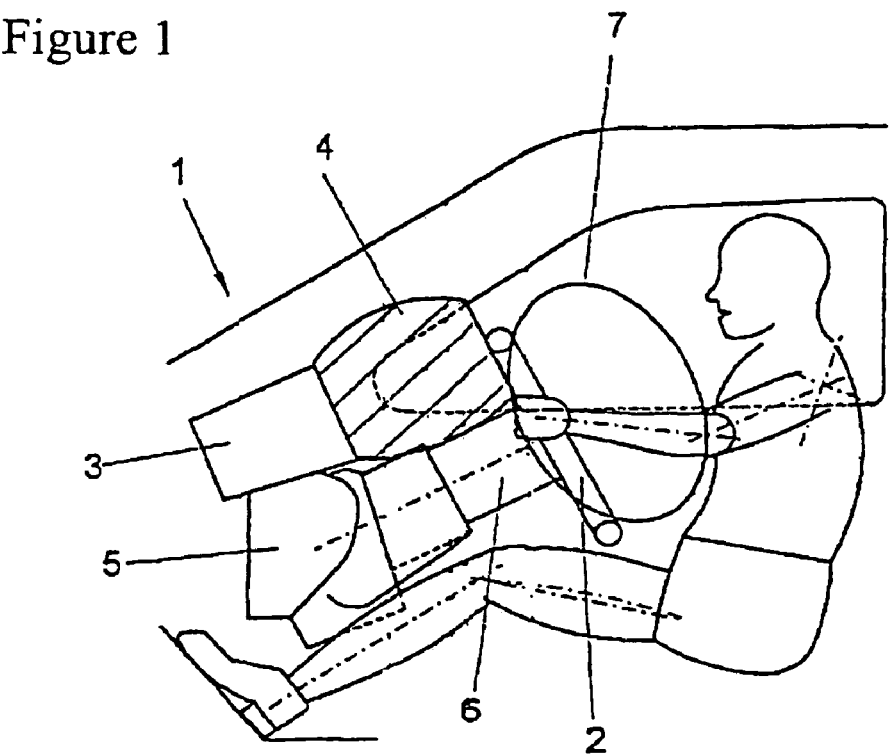
FIG. 1 is a side view of an airbag module according to a first exemplary embodiment of the present invention.
Figure 2:
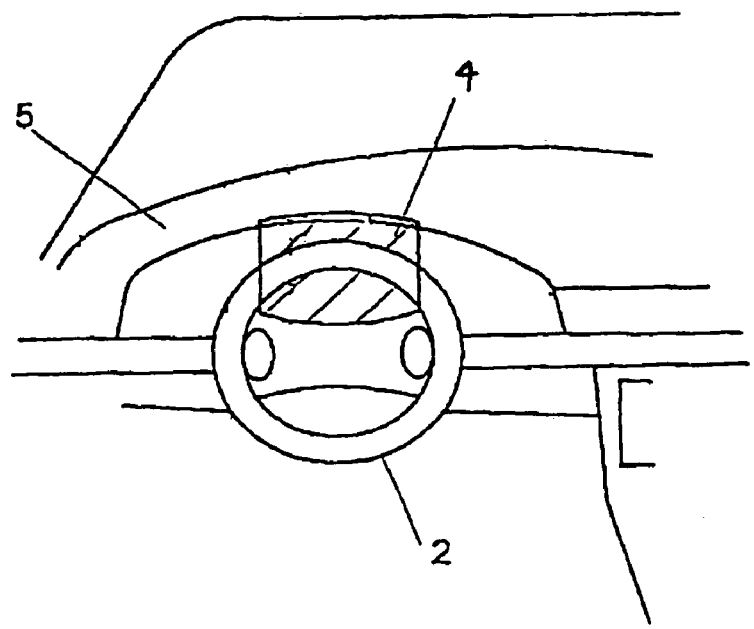
FIG. 2 is a front view of the airbag module of FIG. 1.

FIGS. 1–2 show an airbag module 1 according to a first exemplary embodiment of the present invention after activation in the event of a crash. FIG. 1 shows a side cross section though a passenger cell provided with the airbag module 1. FIG. 2 shows a front plan view of a steering wheel 2 within the passenger cell.

The airbag module 1 comprises a housing 3 and an airbag 4 shown when inflated. The airbag module 1 is arranged in an instrument panel 5 of the vehicle above a steering column 6. When inflated, the airbag 4 extends above the steering column 6 between the steering wheel 2 and the instrument panel 5.

FIGS. 1–2 also show a conventional driver's airbag 7 when inflated.

Figure 3:
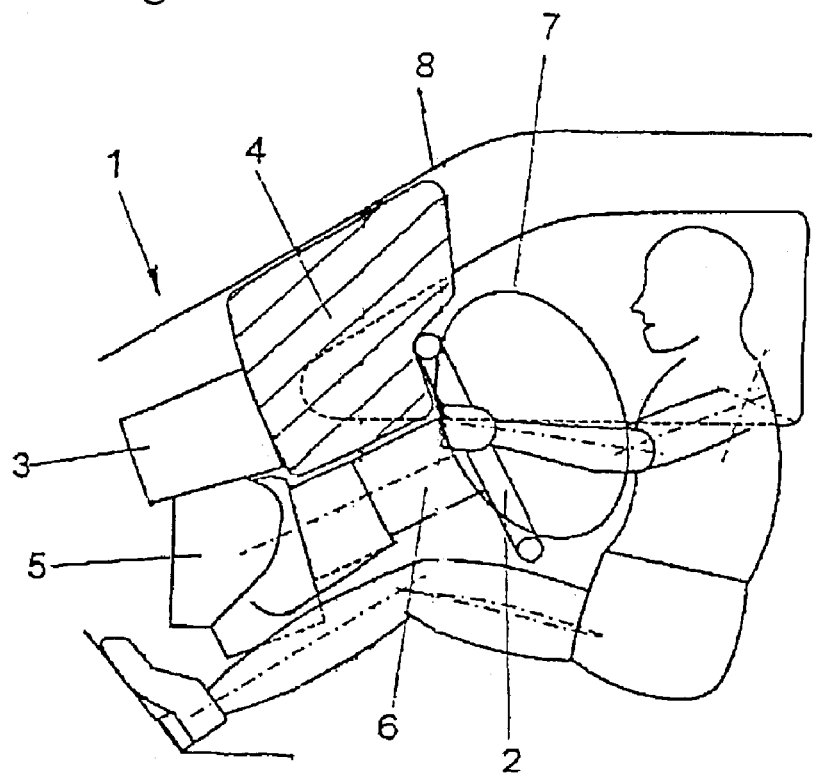
FIG. 3 is a side view of an airbag module according to a second exemplary embodiment of the present invention.
Figure 4:
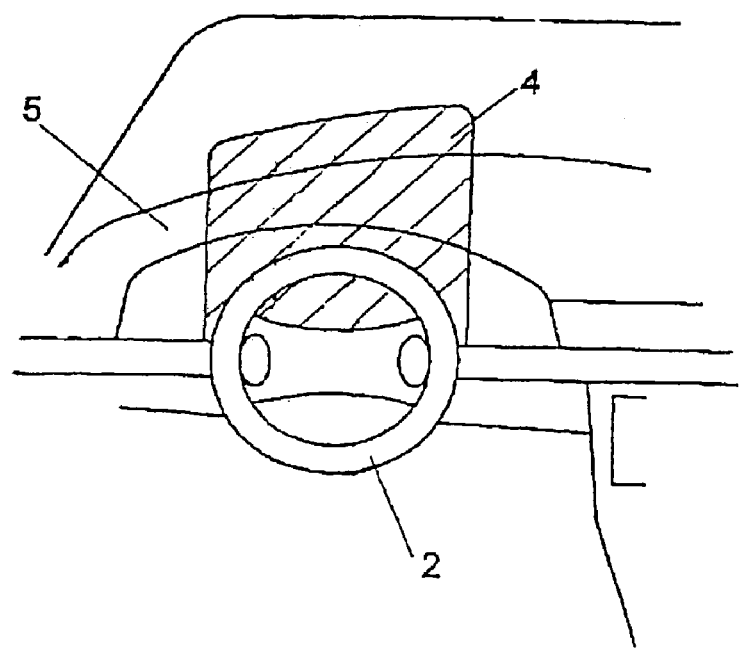
FIG. 4 is a front view of the airbag module of FIG. 3.

FIGS. 3–4 show an airbag module 1 according to a second exemplary embodiment of the present invention. This exemplary embodiment differs from the first exemplary embodiment by the deployed airbag 4 extending between the steering wheel 2 and the housing 3 in an upward direction from the steering column 6 as far as a windshield 8.

Figure 5:
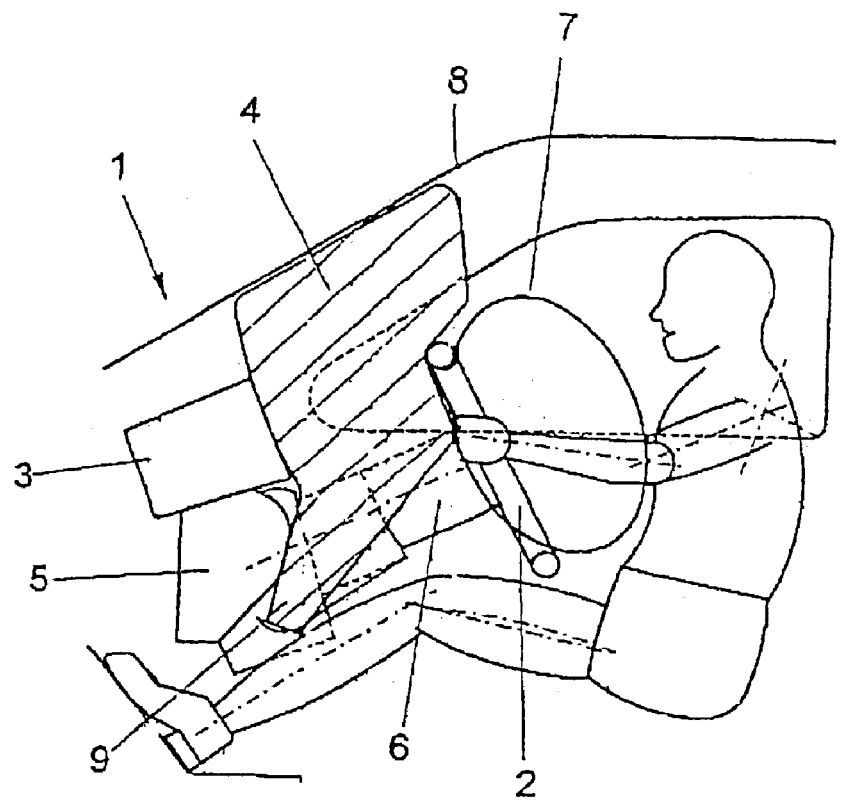
FIG. 5 is a side view of an airbag module according to a third exemplary embodiment of the present invention.
Figure 6:
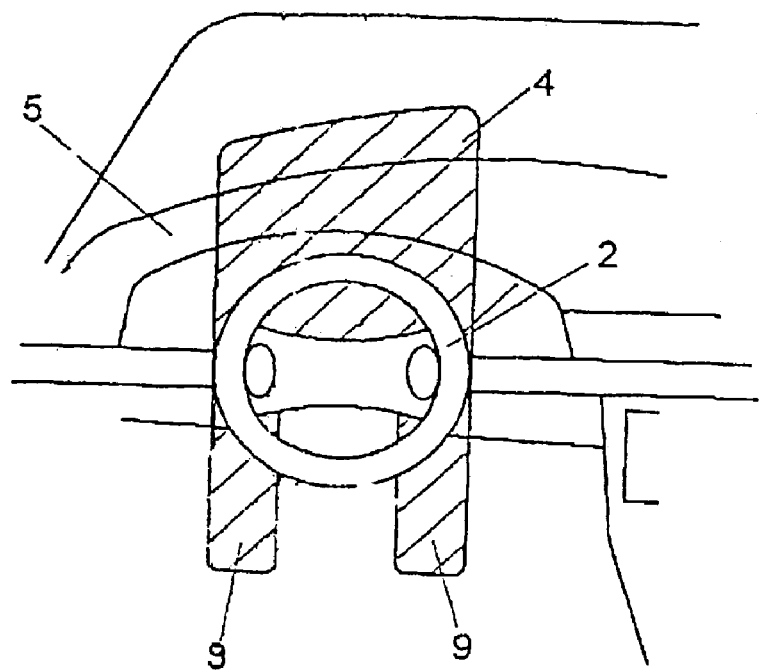
FIG. 6 is a front view of the airbag module of FIG. 5.

FIGS. 5–6 show an airbag module 1 according to a third exemplary embodiment of the present invention. In this embodiment, the inflated airbag 4 has two knee cushions 9 which extend below the steering column 6 between the instrument panel 5 and the knee regions of a vehicle occupant. As can be seen in FIG. 6, the knee cushions 9 extend on both sides of the steering column 6.

Figure 7:
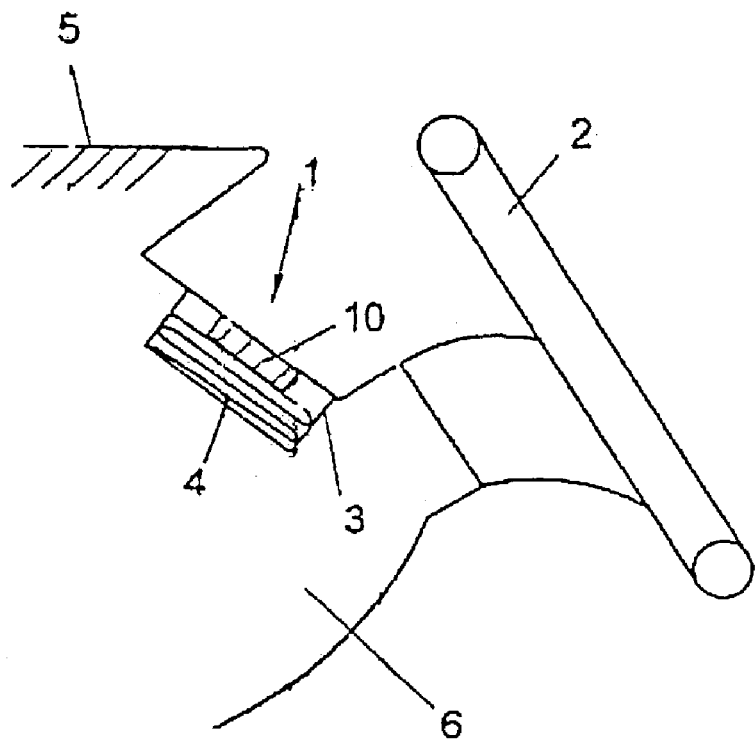
FIG. 7 is a cross-sectional view of an airbag module according to a fourth exemplary embodiment the present invention in a folded state.
Figure 8:
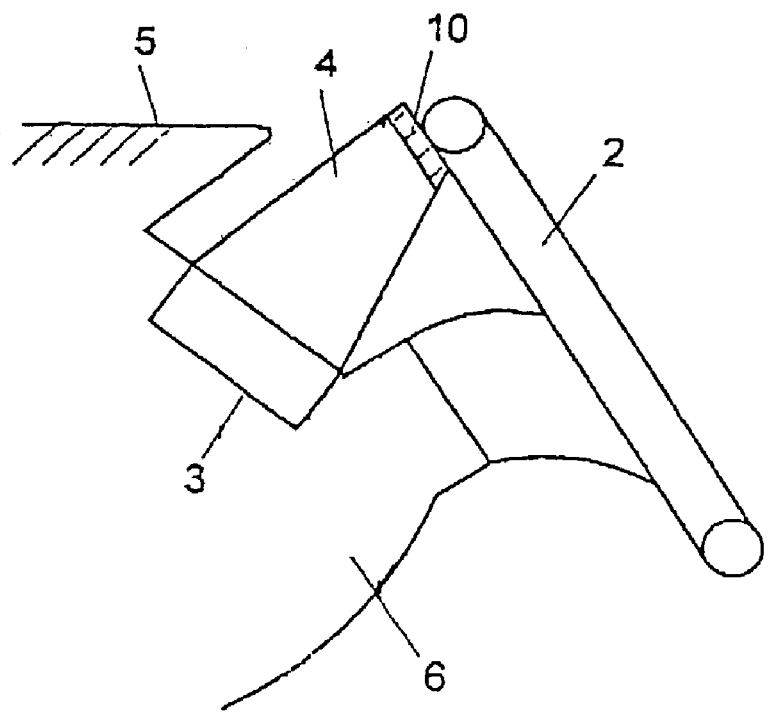
FIG. 8 is a cross-sectional view of the airbag module of FIG. 7 in an inflated state.

FIGS. 7–8 show a refinement variant of the airbag module 1 shown in FIG. 1. In FIG. 7, the airbag module 1 can be seen when not in use, i.e., with the airbag 4 folded up. In FIG. 8, the airbag 4 is inflated.

In the region in which the airbag 4, when inflated, comes into contact with the rim of the steering wheel 2, a supporting element 10 is provided in the form of a reinforcement. The reinforcement may be formed, for example, of multiple layers of material. The reinforcement may also take the form of an insert of material, such as plastic or rubber. The supporting element 10 improves the supporting behavior of the airbag 4 by the flexibility of the airbag 4 due to forces exerted on it by the steering wheel 2 being reduced.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The priority document here, German patent application DE 102 07 885.8, filed Feb. 20, 2002, is hereby incorporated by reference.

What is claimed is:

1. An airbag arrangement for a vehicle, comprising an airbag module arranged in an instrument panel of the vehicle, the airbag module comprising an airbag,
    wherein the airbag includes an element for supporting a steering wheel,
    wherein the airbag is configured to inflate into a position between a steering wheel and the instrument panel, and
    wherein when the airbag is in the position between the steering wheel and the instrument panel, the supporting element contacts a rim of the steering wheel.

2. The airbag arrangement of claim 1, wherein the airbag is configured to inflate into a position that extends above a steering column of the vehicle.

3. The airbag arrangement of claim 1, wherein the airbag is configured to inflate into a position that extends along a steering column of the vehicle and at least partially fills a gap between the instrument panel and the steering wheel.

4. The airbag arrangement of claim 1, wherein the airbag module is integrated in the instrument panel.

5. The airbag arrangement of claim 1, wherein the airbag is configured to inflate upwardly into a position between a steering column and a windshield of the vehicle.

6. The airbag arrangement of claim 5, wherein the airbag is in contact with the windshield of the vehicle.

7. The airbag arrangement of claim 1, wherein the airbag is configured to inflate into a position that extends around a steering column into a gap below the steering column between the instrument panel and a vehicle seat in order to contact the knees of a vehicle occupant.

8. The airbag arrangement of claim 1, wherein the airbag is configured to inflate into a position where the airbag comes into contact with a top region of a rim of the steering wheel and supports the rim.

9. The airbag arrangement of claim 1, wherein the supporting element is formed by a reinforcement integrated in the airbag.

10. The airbag arrangement of claim 9, wherein the reinforcement includes multiple layers of material.

11. The airbag arrangement of claim 9, wherein the reinforcement includes an insert of material.

12. The airbag arrangement of claim 11, wherein the insert is plastic or rubber.

13. The airbag arrangement according to claim 1, wherein the airbag is configured to inflate into a position located only above a steering column of the vehicle.

14. An airbag arrangement for a vehicle, comprising:
    an airbag module arranged in an instrument panel of the vehicle, the airbag module comprising: an airbag,
    the airbag comprising: a reinforcement member,
    wherein the airbag is configured to inflate into a position between a steering wheel and the instrument panel, and
    wherein when the airbag is in the position between the steering wheel and the instrument panel, the reinforcement member contacts and supports a rim of the steering wheel.

15. The airbag arrangement of claim 14, wherein the reinforcement member is integrated in the airbag.

16. The airbag arrangement of claim 14, wherein the reinforcement member includes multiple layers of material.

17. The airbag arrangement of claim 14, wherein the reinforcement member includes an insert of material.

18. The airbag arrangement of claim 17, wherein the insert is plastic or rubber.

* * * * *